United States Patent
Marui et al.

(10) Patent No.: US 8,211,000 B2
(45) Date of Patent: Jul. 3, 2012

(54) CONDUCTIVE ROLLER

(75) Inventors: Takashi Marui, Hyogo (JP); Takeshi Ishimaru, Hyogo (JP); Noriaki Hitomi, Hyogo (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 487 days.

(21) Appl. No.: 12/542,430

(22) Filed: Aug. 17, 2009

(65) Prior Publication Data

US 2010/0069208 A1 Mar. 18, 2010

(30) Foreign Application Priority Data

Sep. 16, 2008 (JP) ................................. 2008-237162

(51) Int. Cl.
*F16C 13/00* (2006.01)
*B21K 1/02* (2006.01)

(52) U.S. Cl. ........ 492/53; 29/895.32; 29/895.3; 492/56; 492/59

(58) Field of Classification Search .................... 492/48, 492/53, 56, 57, 59; 29/895.3, 895.32, 895.33, 29/895, 895.21
See application file for complete search history.

(56) References Cited

U.S. PATENT DOCUMENTS

| | | | |
|---|---|---|---|
| 6,523,263 B2 * | 2/2003 | Jo et al. | 29/895.32 |
| 6,648,807 B2 * | 11/2003 | Hashimoto et al. | 492/59 |
| 6,942,607 B2 * | 9/2005 | Jo et al. | 492/56 |
| 6,983,540 B2 * | 1/2006 | Kato et al. | 29/895.3 |
| 7,226,282 B2 * | 6/2007 | Jo et al. | 425/4 R |
| 7,520,057 B2 * | 4/2009 | Imasaka et al. | 29/895.32 |
| 7,897,076 B2 * | 3/2011 | Ji | 264/51 |
| 8,037,607 B2 * | 10/2011 | Imasaka et al. | 29/895.32 |
| 2001/0002382 A1 * | 5/2001 | Jo et al. | 492/56 |
| 2002/0035020 A1 * | 3/2002 | Yamaguchi et al. | 492/56 |
| 2002/0128139 A1 * | 9/2002 | Hashimoto et al. | 492/59 |
| 2003/0060348 A1 * | 3/2003 | Jo et al. | 492/56 |
| 2003/0125177 A1 * | 7/2003 | Jo et al. | 492/56 |
| 2004/0136753 A1 * | 7/2004 | Kato et al. | 399/176 |
| 2006/0252620 A1 * | 11/2006 | Urano et al. | 492/56 |
| 2008/0107451 A1 * | 5/2008 | Nukada et al. | 399/176 |

(Continued)

FOREIGN PATENT DOCUMENTS

JP 2002139896 A * 5/2002

(Continued)

OTHER PUBLICATIONS

Japanese Office Action issued Jul. 13, 2010, in Japanese 2008-237162.

*Primary Examiner* — Essama Omgba
(74) *Attorney, Agent, or Firm* — Birch, Stewart, Kolasch & Birch, LLP

(57) ABSTRACT

A conductive roller has a core and a conductive foam formed on a peripheral surface thereof. The conductive foam constitutes a three-phase rubber composition containing 35 to 50 parts by mass of epichlorohydrin rubber, 25 to 35 parts by mass of ethylene-propylene-diene copolymer rubber, and 25 to 30 parts by mass of acrylonitrile-butadiene rubber as a rubber component thereof. The conductive foam does not have a coating layer formed on a surface thereof. The conductive roller has an Asker C hardness, an electric resistance value, an average surface-cell diameter, and a number of surface cells set to 30 to 36°, $10^6$ to $10^7 \Omega$, 100 to 200 μm, and 50 to 120/1.5 mm square respectively.

8 Claims, 1 Drawing Sheet

U.S. PATENT DOCUMENTS

| | | | |
|---|---|---|---|
| 2008/0260438 A1* | 10/2008 | Uda et al. | 399/346 |
| 2009/0005225 A1* | 1/2009 | Tsuchiya et al. | 492/56 |
| 2009/0011350 A1* | 1/2009 | Ji | 430/96 |
| 2009/0162109 A1* | 6/2009 | Koyama et al. | 399/286 |

FOREIGN PATENT DOCUMENTS

| | | | |
|---|---|---|---|
| JP | 2004-45656 A | | 2/2004 |
| JP | 2004045656 A | * | 2/2004 |
| JP | 2004271709 A | * | 9/2004 |
| JP | 2005-148467 A | | 6/2005 |
| JP | 2006-145636 A | | 6/2006 |
| JP | 2006-259131 A | | 9/2006 |

\* cited by examiner

CONDUCTIVE ROLLER

This nonprovisional application claims priority under 35 U.S.C. §119(a) on Patent Application No(s). 2008-237162 filed in Japan on Sep. 16, 2008, the entire contents of which are hereby incorporated by reference.

BACKGROUND OF THE INVENTION

1. Field of the Invention

The present invention relates to a conductive roller to be used for an image-forming apparatus such as a printer, a copying machine, a facsimile, an ATM, and the like.

2. Description of the Related Art

In a large number of image-forming apparatuses adopting an electrophotographic method, a contact charge method and a contact transfer method are adopted in which a very small amount of ozone is generated. A roller-shaped member excellent in its wear resistance and toner-transporting performance is used in most of image-forming apparatuses. The roller-shaped member is constructed of a columnar core made of SUS or iron and a conductive layer, disposed on the peripheral surface of the core, which is adjusted to $1\times10^5 \Omega$ to $1\times10^{10} \Omega$ in its electric resistance by means of carbon or an ionic conductive agent.

A part of the conductive layer is composed of an elastic material so that a nip can be securely formed for other members such as a photoreceptor and an intermediate transfer member both carrying images. A foam can be used as the conductive layer.

The conventional image-forming apparatus in which the conductive roller is used has problems described below.

Because pulverized toner having a comparatively large diameter has been widely used, toner which has not been transferred can be collected by a cleaning roller or the like. But polymeric toner which has been used in recent years is a micro-sphere having a diameter of several microns close to a perfect sphere. Therefore it is difficult to collect it. Such being the case, there is a demand for the development of a conductive roller excellent in its transfer efficiency to eliminate the need for cleaning toner.

Rubber forming the conductive layer contains various components including the residue of an initiator used in synthesizing a rubber component, by-products generated when the rubber component is synthesized, low-molecular-weight substances contained in the rubber component, a vulcanizing agent, a softener, and a plasticizer added to the rubber component in molding the rubber composition into a rubber roller. Many of these components react with substances composing the photoreceptor and the intermediate transfer member. When the conductive roller is left for a long time with the conductive roller being pressed against the photoreceptor and the intermediate transfer member, the components of the conductive roller exude therefrom and stick to the photoreceptor and the intermediate transfer member, thus forming a defective image. In a serious case, the surface of the photoreceptor and that of the intermediate transfer member react with the components of the conductive roller and are modified and whitened. Consequently subsequently formed images are defective.

To solve this problem, it is conceivable to coat the surface of a single-layer conductive roller with a substance forming a barrier layer for preventing components contained in the rubber from exuding therefrom. But the conductive roller has a plurality of layers. Thus the material cost is high and in addition the production step increases. Therefore the cost for producing the conductive roller is high.

To solve these problems, the present applicant has developed the following conductive rollers as disclosed in the following patent documents 1 and 2.

The conductive roller disclosed in Japanese Patent Application Laid-Open No. 2006-259131 (patent document 1) has the conductive foam consisting of the rubber composition containing the specific acrylonitrile butadiene rubber and the specific epichlorohydrin rubber at the predetermined ratio. The conductive foam has a maximum cell diameter not more than 200 um, a minimum cell diameter not less than 10 um, and a Shore E hardness of 20 to 50.

The conductive roller has micro-cells and a low hardness, and a sufficient nip width is obtained. Consequently the conductive roller has an improved transfer efficiency, and there is a decrease in the amount of residual toner which remains on the surface of the photoreceptor and the intermediate transfer member without being transferred. Thus this conductive roller has the advantage that the conductive roller is capable of complying with the recent demand for the development of the conductive roller which eliminates the need for cleaning toner.

But it has been found that in the conductive roller disclosed in the patent document 1, there is room for improvement in the pollution of other members in contact therewith.

In the conductive roller disclosed in Japanese Patent Application Laid-Open No. 2006-145636 (patent document 2), the oxide film is formed on the outermost surface of the conductive elastic layer. The predetermined relationship is established between the initial electric resistance R0 of the conductive roller when a voltage of 1000V is applied thereto and the electric resistance R100 thereof after the voltage is continuously applied thereto for 100 hours. In the third embodiment of the conductive roller, the conductive elastic layer is composed of the continuous phase consisting of the acrylonitrile butadiene rubber (NBR), the first uncontinuous phase consisting of the epichlorohydrin rubber, and the second uncontinuous phase consisting of the ethylene-propylene-diene copolymer rubber (EPDM). It is essential that the ionic conductive agent is locally present in the first uncontinuous phase consisting of the epichlorohydrin rubber.

The conductive roller disclosed in the patent document 2 has the advantage that it is capable of effectively preventing other members from being polluted and can be supplied at a low cost in a large amount without coating the surface of the conductive elastic layer with an expensive material forming the barrier layer.

But in the conductive roller disclosed in the patent document 2, the cell diameter and the number of cells when a foam is used as the conductive elastic layer are not investigated. The cell diameter and the number of cells affect the hardness and electric resistance of the conductive roller. Thus there is room for improvement in producing a conductive foam having a proper number of cells and a proper cell diameter.

Patent document 1: Japanese Patent Application Laid-Open No. 2006-259131

Patent document 2: Japanese Patent Application Laid-Open No. 2006-145636

SUMMARY OF THE INVENTION

It is an object of the present invention to provide a conductive roller which is capable of effectively preventing pollution of other members with which the conductive foamed roller contacts, has a low hardness and a low electric resistance, and is excellent in the migration of toner that is achieved by controlling the number and diameter of cells of a conductive foam of the conductive roller.

To solve the above-described problems, the present invention provides a conductive roller having a core and a conductive foam formed on a peripheral surface thereof. The conductive foam consists of a three-phase rubber composition containing 35 to 50 parts by mass of epichlorohydrin rubber, 25 to 35 parts by mass of ethylene-propylene-diene copolymer rubber, and 25 to 30 parts by mass of acrylonitrile-butadiene rubber as a rubber component thereof. The conductive foam does not have a coating layer formed on a surface thereof. The conductive roller has an Asker C hardness, an electric resistance value, an average surface-cell diameter, and a number of surface cells set to 30 to 36°, $10^6$ to $10^7 \Omega$, 100 to 200 μm, and 50 to 120/1.5 mm square respectively.

Because the conductive foam of the conductive roller of the present invention contains 35 to 50 parts by mass of the epichlorohydrin rubber as the rubber component thereof, it is possible to decrease the hardness and electric resistance of the conductive foam. It is difficult to achieve a decrease in the hardness of the conductive foam and the electric resistance thereof. A known method is capable of achieving a decrease in the electric resistance of the conductive foam by increasing the amount of a conductive agent such as carbon contained in the rubber composition. But this method is incapable of achieving a decrease in the hardness of the conductive foam.

It is preferable to use the epichlorohydrin rubber containing a comparatively large amount of the ethylene oxide component. More specifically the copolymerization ratio (EO ratio) of the ethylene oxide component is favorably 50 to 80 mol %, more favorably 65 to 80 mol %, and most favorably 70 to 80 mol %. It is possible to easily achieve a decrease in the electric resistance of the conductive foam by using the epichlorohydrin rubber containing the ethylene oxide component in the above-described range therefor.

Because the conductive foam contains 25 to 30 parts by mass of the NBR as its rubber component, it is possible to decrease the hardness of the conductive foam to a higher extent.

The NBR containing liquid NBR is preferable. The content of the NBR is favorably 20 to 80 mass %, more favorably 30 to 70 mass %, and most favorably 40 to 60 mass %. It is possible to easily achieve a decrease in the hardness of the conductive foam by using the NBR in the above-described range therefor.

Because the conductive foam containing 25 to 35 parts by mass of the EPDM as its rubber component, it is possible to effectively prevent pollution of other members which contact the conductive foam. That is, when the content of the EPDM is less than 25 parts by mass, the conductive foam is incapable of effectively preventing the pollution of other members which contact the conductive foam. When the conductive foam contains more than 35 parts by mass, the mixing amount of the epichlorohydrin rubber and that of the NBR become comparatively small. Consequently the conductive foam has a high hardness.

The conductive foam may contain HAF carbon to enhance the conductivity thereof. When the conductive foam contains a large amount of the HAF carbon, the conductive foam has a high hardness. Thus the mixing ratio of the HAF carbon to 100 parts by mass of the rubber component is set to preferably not more than 10 parts by mass.

The present invention provides a method of producing a conductive roller. The method includes the steps of adding a foaming agent and a vulcanizing agent to a rubber component consisting of epichlorohydrin rubber, ethylene-propylene-diene copolymer rubber, and acrylonitrile-butadiene rubber and kneading the components; extruding said kneaded components in a shape of a roller by an extrusion molder; and vulcanizing and foaming an obtained roller-shaped preform at not less than 160° C. nor more than 170° C. or vulcanizing and foaming the obtained roller-shaped preform after initially setting a temperature to not less than 140° C. and less than 160° C., raising the temperature to not less than 160° C. nor more than 170° C.; and inserting the core into a hollow portion of the obtained conductive foam and fixing the core thereto.

As described above, continuous vulcanization is performed for the rubber composition containing the three kinds of the rubber components by keeping predetermined temperatures not less than 160° C. nor more than 170° C. from an initial temperature to a final temperature. Alternatively two-stage vulcanization is performed by setting the initial temperature to not less than 140° C. and less than 160° C. and thereafter raising the temperature to not less than 160° C. nor more than 170° C. By controlling the vulcanization temperature in this manner, it is possible to control the cell diameter and the number of cells to the range specified in the present invention and achieve a low hardness for the conductive foam.

The vulcanization temperature is set to the above-described one for the following reason. When the continuous vulcanization is performed out of the above-described temperature range, i.e., when the continuous vulcanization is performed at the vulcanization temperature less than 160° C. or when the two-stage vulcanization is performed at the initial vulcanization temperature less than 140° C. and at the secondary vulcanization temperature less than 160° C., the cell diameter is small and the number of cells is large. Thus the conductive foam has a high hardness. On the other hand, when the vulcanization temperature is more than 170° C., the cell diameter is large and the number of cells is small. Thus the conductive foam has a low hardness.

It is preferable the conductive foam of the conductive roller of the present invention has the Asker C hardness, the electric resistance value, the average surface-cell diameter, and the number of surface cells set to 30 to 36°, $10^6$ to $10^7 \Omega$, 100 to 200 μm, and 50 to 120/1.5 mm square respectively.

The above-described construction allows a low hardness, a low electric resistance, and the formation of micro-cells to be achieved. Thereby it is possible to obtain a sufficient nip width and smoothly migrate toner. That is, the conductive roller is capable of smoothly receiving the toner from other members and smoothly giving the toner that has stuck thereto to other members.

The Asker C hardness of the conductive foam of the present invention is set to 30 to 36° for the reason described below. When the Asker C hardness is less than 30°, the conductive foam is so soft that it has a very large compressive strain and easily gives damage to the toner. On the other hand, when the Asker C hardness of the conductive foam is more than 36°, it is so hard that it wears in a large amount when it contacts a rigid photoreceptor and a defective image is liable to be formed. In addition the conductive foam has a low toner-scraping performance.

The average surface-cell diameter is set to 100 to 200 μm for the reason described below. When the average surface-cell diameter is set to less than 100 μm, the cell is easily clogged with the toner. That is, the conductive foam has a problem of clogging that easily occurs. When the average surface-cell diameter is set to more than 200 μm, the conductive foam has a problem that it has a low toner-scraping performance, and in addition unfavorable toner separation occurs because the toner is liable to agglomerate inside the cell.

The number of surface cells is set to 50 to 120/1.5 mm square for the reason described below. When the number of the surface cells is set to less than 50/1.5 mm square, the conductive foam has the problem that it has a low toner-scraping performance, and in addition unfavorable toner separation occurs because the toner is liable to agglomerate inside the cell, When the number of the surface cells exceeds 120/1.5 mm square, the conductive foam has the problem that the cells are clogged with the toner.

The electric resistance value of the conductive roller is set to $10^6$ to $10^7 \Omega$ for the reason described below. When the electric resistance value is set to less than $10^6 \Omega$, there arise a problem that the conductive roller gives an electrical damage to adjacent other members, particularly the photoreceptor and in some cases, charges it. When the electric resistance value is set to more than $10^7 \Omega$, there arises a problem that the conductive roller electrostatically attracts the toner and thus has a low toner separation performance.

The conductive roller of the present invention can be used for various applications which require electric conductivity. The conductive roller can be preferably used for an image-forming apparatus such as a printer, an electrostatic copying machine, a facsimile apparatus, an ATM, and the like. More specifically, the conductive roller is used as a charging roller for uniformly charging a photoreceptor drum, a developing roller for attaching the toner to the photoreceptor, a transfer roller for transferring a toner image from the photoreceptor to paper or an intermediate transfer belt or the like, a toner supply roller for transporting the toner, a driving roller for driving a transfer belt from the inner side thereof, a paper-feeding roller (more specifically, a paper supply roller, a transport roller or a paper discharge roller constructing a paper supply mechanism), and a cleaning roller for removing residual toner. It is preferable to use the conductive roller of the present invention as a member relating to the migration of the toner. Above all it is preferable to use the conductive roller as the cleaning roller for scraping the toner.

In the conductive roller of the present invention, it is possible to prevent low-molecular-weight substances, a vulcanizing agent, a softener, and a plasticizer contained in the rubber composition from exuding from the surface of the conductive roller. Thereby it is possible to prevent other members which contact the conductive roller from being polluted. Therefore the conductive roller of the present invention poses neither the problem that the exuded substances stick to the surface of the photoreceptor and the intermediate transfer member and thereby a defective image is formed nor the problem that the substances of the photoreceptor and the intermediate transfer member react with the exuded substances and are modified and whitened. Therefore it is possible to prevent defective images from being formed subsequently.

In the present invention, the surface of the conductive roller is not coated with an expensive barrier layer-forming material. Therefore the present invention is capable of supplying inexpensive conductive roller in a large quantity.

In the conductive foam of the conductive roller of the present invention, the mixing amounts of the three kinds of the rubber components are adjusted to allow the Asker C hardness, the electric resistance value, the cell diameter, and the number of cells to be in the predetermined range respectively. Thereby it is possible to smoothly migrate the toner. That is, the conductive roller is capable of smoothly receiving the toner from other members and smoothly giving the toner that has stuck thereto to other members. Thereby by using the conductive roller of the present invention as the cleaning roller, it is possible to favorably scrape the toner that has remained on the photoreceptor and the like.

DETAILED DESCRIPTION OF THE PREFERRED EMBODIMENTS

A conductive roller of the present invention is described in detail below.

Figure 1:
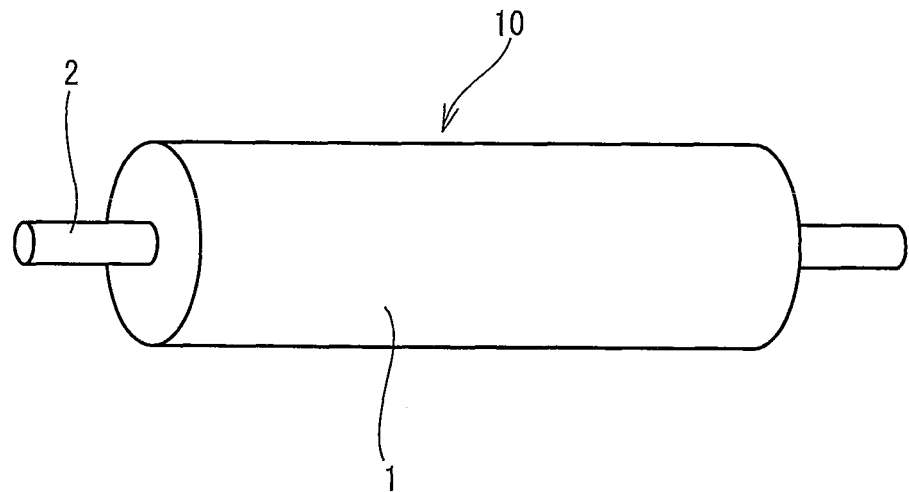
FIG. 1 is schematic view showing a conductive roller of the present invention.

A conductive roller 10 of the present invention shown in FIG. 1 is used as a cleaning roller. In the conductive roller 10, a core 2 is inserted into a hollow portion of a cylindrical conductive foam 1 and fixed thereto with an adhesive agent. It is preferable to compose the core 2 of metal such as aluminum, an aluminum alloy, SUS or iron.

The conductive foam 1 is composed of a rubber composition containing 35 to 50 parts by mass of epichlorohydrin rubber, 25 to 35 parts by mass of EPDM, and 25 to 30 parts by mass of NBR.

Various epichlorohydrin polymers can be used as the epichlorohydrin rubber. As the epichlorohydrin polymer, it is possible to list a epichlorohydrin (ECO) homopolymerized rubber, an epichlorohydrin-ethylene oxide (EO) copolymer, an epichlorohydrin-propylene oxide (PO) copolymer, an epichlorohydrin-allyl glycidyl ether (AGE) copolymer, an epichlorohydrin-ethylene oxide-allyl glycidyl ether copolymer, an epichlorohydrin-propylene oxide-allyl glycidyl ether copolymer, and an epichlorohydrin-ethylene oxide-propylene oxide-allyl glycidyl ether copolymer. Of these epichlorohydrin polymers, it is preferable to use the epichlorohydrin-ethylene oxide-allyl glycidyl ether copolymer.

In the epichlorohydrin rubber, the copolymerization ratio (EO ratio) of the ethylene oxide component is favorably 50 to 80 mol %, more favorably 65 to 80 mol %, and most favorably 70 to 80 mol %. It is possible to adjust the EO ratio to the above-described range not only by using the epichlorohydrin rubber having the EO ratio in the above-described range but also by blending a plurality of the epichlorohydrin rubbers having different EO ratios.

The reason the EO ratio of the epichlorohydrin rubber is set to not less than 50 mol % is as follows: As the content of the ethylene oxide becomes larger, the electric resistance of the epichlorohydrin rubber becomes decreasingly low. Thus when the EO ratio is less than 50 mol %, it is necessary to use a large amount of the epichlorohydrin rubber to obtain the electric resistance of $1\times10^6$ to $1\times10^7 \Omega$, which is disadvantageous in terms of the cost. When the EO ratio is not less than 65 mol %, a low electric resistance can be achieved more easily. The reason the EO ratio of the epichlorohydrin rubber is set to not more than 80 mol % is as follows: When the EO ratio of the epichlorohydrin rubber exceeds 80 mol %, the crystallization of the ethylene oxide progresses. Thereby the epichlorohydrin rubber becomes inactive and the ionic conductivity thereof deteriorates, thus having a high electric resistance.

The EPDM rubber includes an oil-unextended type consisting of a rubber component and an oil-extended type containing the rubber component and extended oil. Although both the oil-unextended type and the oil-extended type can be used in the present invention, the oil-unextended type is more favorable than the oil-extended type. As examples of diene monomers contained in the EPDM rubber, dicyclopentadiene, methylenenorbornene, ethylidenenorbornene, 1,4-hexadiene, and cyclooctadiene are listed. Although any of these diene monomers can be used in the present invention, the EPDM containing the ethylidenenorbornene as the diene rubber is favorable. The EPDM containing 50 to 70 mass % of ethylene is especially favorable.

As the NBR, it is possible to use any of low-nitrile NBR containing acrylonitrile at not more than 24%, intermediate-nitrile NBR containing the acrylonitrile in the range of 25 to 30%, moderate high-nitrile NBR containing the acrylonitrile in the range of 31 to 35%, high-nitrile NBR containing the acrylonitrile in the range of 36 to 42%, and very high-nitrile NBR containing the acrylonitrile at not less than 43%. Of these NBR, it is preferable to use the moderate high-nitrile NBR.

As described above, the NBR containing liquid NBR is preferable.

In addition to the rubber component, the conductive foam 1 may contain a vulcanizing agent for vulcanizing the rubber component and as desired, a vulcanization accelerator and a vulcanization-accelerating assistant.

As the vulcanizing agent, sulfur is preferable because it allows a low electric resistance to be achieved and allows a favorable balance to be achieved between a vulcanizing speed and a foaming speed. As the vulcanizing agent, it is also possible to use organic sulfur-containing compounds or peroxides. It is possible to use the organic sulfur-containing compounds together with the peroxides. It is also possible to use the organic sulfur-containing compounds and the peroxides together with the sulfur. As the organic sulfur-containing compounds, tetramethylthiuram disulfide and N,N-dithiobis-morpholine are exemplified. As the peroxides, dicumyl peroxide and benzoyl peroxide can be exemplified.

The addition amount of the vulcanizing agent for 100 parts by mass of the rubber component is set to favorably not less than 0.5 parts by mass nor more than 5 parts by mass and more favorably not less than 1 part by mass nor more than 3 parts by mass.

As the vulcanizing accelerating agent, it is possible to use inorganic accelerating agents such as slaked lime, magnesia (MgO), and litharge (PbO); and organic accelerating agents shown below. As the organic accelerating agent, it is possible to list thiazoles such as 2-melcapto-benzothiazole, dibenzothiazolyl disulfide; sulfinamides such as N-cyclohexyl-2-benzothiazylsulfenamide; thiurams such as tetramethylthiuram monosulfide, tetramethylthiuram disulfide, tetraethylthiuram disulfide, and dipentamethylenethiuram tetrasulfide; and thioureas. It is possible to use these vulcanizing accelerating agents singly or in combination. The conductive foam does not necessarily have to contain the vulcanizing accelerating agent in dependence on the kind of the vulcanizing agent.

The mixing amount of the vulcanizing accelerating agent for 100 parts by mass of the rubber component is set to favorably not less than 0.5 nor more than 5 parts by mass and more favorably not less than 1 nor more than 4 parts by mass.

The conductive foam may contain the vulcanizing accelerating assistants. As the vulcanization-accelerating assistant, it is possible to list metal oxides such as zinc white; fatty acids such as stearic acid, oleic acid, cotton seed fatty acid, and the like; and known vulcanizing accelerating assistants.

In forming the conductive foam 1, it is especially favorable to foam the rubber composition with a foaming agent.

That is, it is preferable to adopt a foaming method of mixing the foaming agent with the rubber composition composing the conductive foam 1, and thereafter generating a decomposed gas from the foaming agent by means of heat at the time of vulcanization.

As the foaming agent, azodicarbonamide (ADCA), 4,4'-oxybis (benzene sulfonyl hydrazide) (OBSH), N,N'-dinitrosopentamethylenetetramine (DPT), and 5,5'-bis-1H-tetrazole (BHT) are listed. It is preferable to use the ADCA.

In dependence on the kind of the foaming agent, a foaming assistant may be used. For example, when the ADCA is used as the foaming agent, urea can be used as the foaming assistant.

The addition amount of the foaming agent is so selected that in the conductive foam 1 of the present invention, the Asker C hardness, the average surface-cell diameter, and the number of surface cells are set to 30 to 36°, 100 to 200 μm, and 50 to 120/1.5 mm square respectively. For example, the addition amount of the foaming agent for 100 parts by mass of the rubber component is favorably less than 20 parts by mass and more favorably not less than 4 parts by mass and less than 15 parts by mass.

In adding the foaming assistant to the rubber component, the addition amount of the foaming assistant is appropriately selected according to the addition amount of the foaming agent. For example, let it be supposed that the ADCA is used as the foaming agent and that the urea is used as the foaming assistant. Supposing that the content of the ADCA for 100 parts by mass of the rubber component is X parts by mass and that the content of the urea for 100 parts by mass of the rubber component is Y parts by mass, $1 \leq X/Y \leq 3$, and favorably $1 \leq X/Y \leq 2$, and more favorably $1 \leq X/Y \leq 1.5$.

In addition to the above-described components, the conductive foam 1 may appropriately contain the following additives unless the use thereof departs from the object of the present invention: a filler, a softening agent, an age resistor, an antioxidant, an ultraviolet ray absorber, a lubricant, a pigment, an antistatic agent, a fire retardant, a neutralizer, a plasticizer, a core-forming agent, a foam prevention agent, and a crosslinking agent.

Of these additives, it is preferable to add the filler which enhances the mechanical strength of the conductive foam 1 to the rubber component.

It is preferable that the conductive foam 1 contains an acid-accepting agent to prevent vulcanization from being inhibited and members which contact the conductive foam 1 from being polluted. As the acid-accepting agent, hydrotalcites and magsarat are favorable because they have preferable dispersibility. In addition, as the acid-accepting agent, it is possible to use various substances acting as acid acceptors.

The mixing ratio of the acid-accepting agent to 100 parts by mass of the rubber component is set to favorably not less than 1 nor more than 10 parts by mass and more favorably about 3 parts by mass. The mixing ratio of the acid-accepting agent to 100 parts by mass of the rubber component is set to favorably not less than one part by mass to allow the acid-accepting agent to effectively display the effect of preventing the inhibition of vulcanization and the members from being polluted. The mixing ratio of the acid-accepting agent to 100 parts by mass of the rubber component is set to favorably not more than 10 parts by mass to prevent an increase of the hardness of the conductive foam 1.

The method of producing the conductive roller of the present invention is described below.

The foaming agent, the foaming assistant, the vulcanizing agent, the vulcanization accelerator, the filler, and other desired components are added to the rubber component consisting of the epichlorohydrin rubber, the EPDM, and the NBR. Thereafter the components are mixed one another by carrying out a known method with a Banbury mixer, a kneader, an open roll or the like. A kneading temperature and a kneading period of time are appropriately selected. For example, it is preferable to knead the components at 80 to 120° C. for 1 to 60 minutes.

The obtained rubber composition is preformed in the shape of a roll by using an extrusion molder.

Thereafter the obtained preform is vulcanized and foamed. The vulcanization and the foaming are performed by continuous vulcanization at not less than 160° C. nor more than 170° C. or by two-stage vulcanization performed at not less than 140° C. and less than 160° C. and thereafter at a higher temperature not less than 160° C. nor more than 170° C. In both continuous vulcanization and the two-stage vulcanization, the entire vulcanization period of time is set to favorably not less than 10 minutes nor more than 120 minutes, more favorably not less than 10 minutes nor more than 60 minutes, and most favorably not less than 30 minutes nor more than 40 minutes.

When the preform is vulcanized and foamed by the two-stage vulcanization, it is preferable to set the difference between the initial vulcanization temperature and the secondary vulcanization temperature to not less than 10° C. nor more than 30° C. The distribution of the vulcanization period of time cannot be definitely said but an optimum distribution of the vulcanization period of time is appropriately selected. It is preferable to continue vulcanization at a constant temperature for not less than five minutes. More specifically, it is preferable to vulcanize the preform at not less than 140° C. nor more than 150° C. for 5 to 20 minutes and thereafter at not less than 160° C. nor more than 170° C. for 5 to 40 minutes. It is especially favorable to vulcanize the preform at 140 to 150° C. for 10 minutes and at 160° C. for 20 minutes.

Thereafter the core 2 is inserted into the conductive foam 1 obtained by vulcanizing and foaming the preform. It is preferable to apply an adhesive agent to the core 2 in advance and bond the conductive foam 1 and the core 2 to each other by heating. The core 2 may be fixed to the conductive foam 1 by inserting the core 2 into the conductive foam 1 by press fit.

Thereafter the conductive foam 1 is cut to a desired length and the surface thereof is polished to obtain the conductive roller of the present invention.

In the above-described producing conditions, the conductive foam of the conductive roller of the present invention has the Asker C hardness, the electric resistance value, the average surface-cell diameter, and the number of surface cells set to 30 to 36°, $10^6$ to $10^7 \Omega$, 100 to 200 μm, and 50 to 120/1.5 mm square respectively. Each of the above-described values (properties) is measured as described in the examples of the present invention shown below.

The present invention is described in more detail below by way of examples of the present invention and comparison examples.

Epichlorohydrin rubber ("Epion 301" produced by DAISO CO., LTD.), EPDM ("Esprene 505A" produced by Sumitomo Chemical Co., Ltd.), and NBR ("Nipporu DN223" produced by Zeon Corporation) were mixed with one another at the mixing ratios (numerical unit: part by mass) shown in table 1.

In addition, six parts by mass of the foaming agent consisting of ADCA ("BINIHORU AC#3" produced by Eiwa Chemical Co., Ltd.), four parts by mass of the foaming assistant consisting of urea ("Cellpaste 101" produced by Eiwa Chemical Industry Co., Ltd.), 1.5 parts by mass of the vulcanizing agent consisting of powdery sulfur (produced by Tsurumi Chemical Industry Co., Ltd.), 1.5 parts by mass of the vulcanization accelerator consisting of "Nocceler DM" (produced by Ouchishinko Chemical Industrial Co., Ltd.), 0.5 parts by mass of the vulcanization accelerator consisting of "Nocceler TS" (produced by Ouchishinko Chemical Industrial Co., Ltd.), and 10 parts by mass of the filler consisting of the HAF carbon ("SEAST 3" produced by Tokai Carbon Co., Ltd.) were added to the rubber component.

After the components were supplied to a kneader and kneaded at 100° C. for 1 to 20 minutes, they were supplied to an extrusion molder to form a roller-shaped preform. The obtained preform was vulcanized and foamed for 30 minutes at the temperature shown in table 1 to obtain a conductive foam of each of the examples and the comparison examples.

In the example 1, the obtained preform was vulcanized and foamed for 10 minutes at 150° C. and for 20 minutes at 160° C.

Thereafter a metal shaft (φ6 mm) to which an adhesive agent was applied in advance was inserted into the conductive foam. After the conductive foam and the shaft were fixed to each other by heating the conductive foam, the conductive foam was cut to a desired length, and the surface thereof was polished to obtain a conductive roller of each of the examples and the comparison examples each having a shaft diameter of φ6 mm, an outer diameter of φ11 mm, and an axial (rubber) length of 230 mm. Tests described below were conducted on the obtained conductive rollers.

TABLE 1

|  | Example 1 | Example 2 | Comparison Example 1 | Comparison Example 2 | Comparison Example 3 | Comparison Example 4 | Comparison Example 5 | Comparison Example 6 |
| --- | --- | --- | --- | --- | --- | --- | --- | --- |
| Epichlorohydrin rubber | 50 | 35 | 25 | 50 | 50 | 65 | 40 | 40 |
| EPDM | 25 | 35 | 40 | 10 | 40 | 15 | 45 | 15 |
| NBR | 25 | 30 | 35 | 40 | 10 | 20 | 15 | 45 |
| Vulcanizing agent | 1.5 | 1.5 | 1.5 | 1.5 | 1.5 | 1.5 | 1.5 | 1.5 |
| Vulcanization accelerator A | 1.5 | 1.5 | 1.5 | 1.5 | 1.5 | 1.5 | 1.5 | 1.5 |
| Vulcanization accelerator B | 0.5 | 0.5 | 0.5 | 0.5 | 0.5 | 0.5 | 0.5 | 0.5 |
| Foaming agent | 6 | 6 | 6 | 6 | 6 | 6 | 6 | 6 |
| Foaming assistant | 4 | 4 | 4 | 4 | 4 | 4 | 4 | 4 |
| Filler | 10 | 10 | 10 | 10 | 10 | 10 | 10 | 10 |
| Vulcanizing temperature | 160 | 160 | 160 | 160 | 160 | 160 | 160 | 160 |
| Asker C hardness | 35 | 35 | 35 | 34 | 39 | 40 | 40 | 35 |
| Electric resistance value (log Ω) | 6.5 | 6.9 | 7.7 | 6.7 | 6.6 | 6.4 | 6.9 | 6.9 |
| Average cell diameter | 160 | 140 | 130 | 170 | 110 | 100 | 120 | 140 |
| Average number of cells | 70 | 80 | 100 | 50 | 120 | 130 | 110 | 90 |
| Pollution of | Did not | Did not | Did not | Occurred | Did not | Occurred | Did not | Occurred |

TABLE 1-continued

|  | Example 1 | Example 2 | Comparison Example 1 | Comparison Example 2 | Comparison Example 3 | Comparison Example 4 | Comparison Example 5 | Comparison Example 6 |
|---|---|---|---|---|---|---|---|---|
| photoreceptor | occur | occur | occur |  | occur | occur | occur |  |
| Toner-scraping performance | ○ | ○ | X | ○ | X | X | X | ○ |
| Comprehensive evaluation | ○ | ○ | X | X | X | X | X | X |

Measurement of Hardness

In environment having a temperature of 23° C. and a relative humidity of 55%, an Asker C hardness meter was vertically fixed to a central portion of each conductive roller and a load of 500 g was applied to left and right shaft portions thereof. A value shown after the elapse of five seconds was read.

Measurement of Electric Resistance Value

Figure 2:
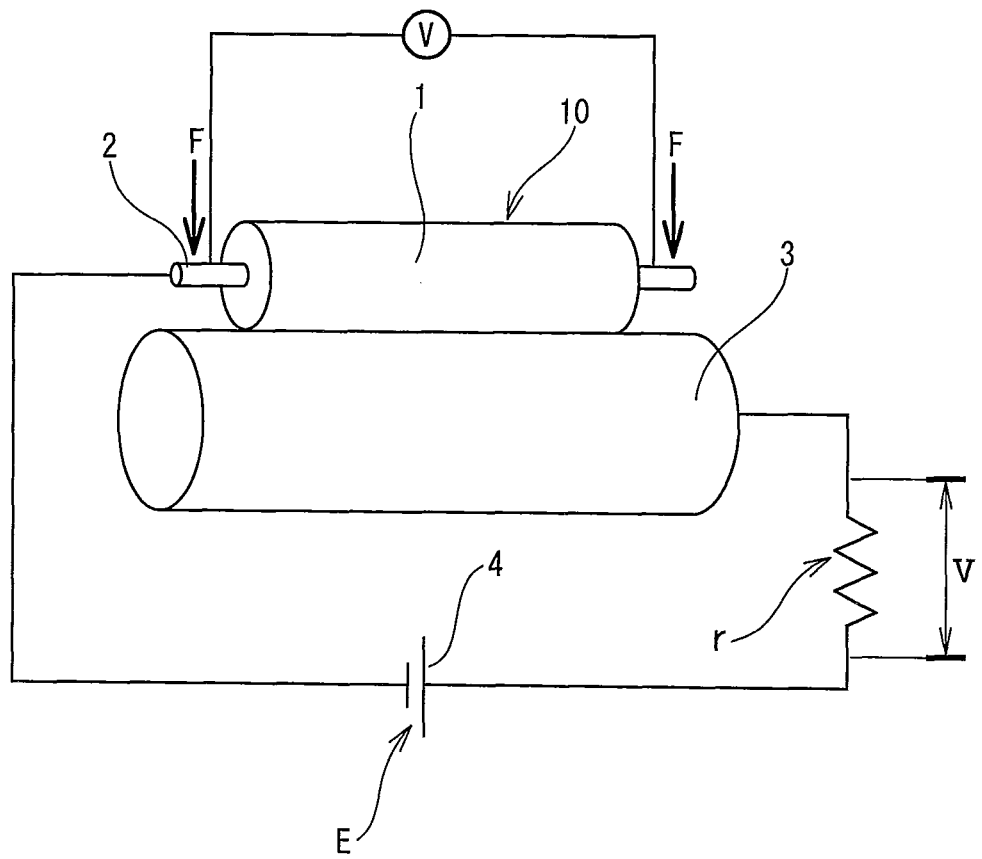
FIG. 2 shows a method of measuring an electric resistance value of the conductive roller.

To measure the electric resistance of each roller, as shown in FIG. 2, a conductive foam 1 through which a core 2 was inserted was mounted on an aluminum drum 3, with the conductive foam 1 in contact with the aluminum drum 3. A leading end of a conductor having an internal electric resistance of r (10 kΩ) connected to a positive side of a power source 4 was connected to one end surface of the aluminum drum 3. A leading end of a conductor connected to a negative side of the power source 4 was connected to one end surface, of the conductive foam 1, which was disposed opposite to the one end surface of the aluminum drum 3. In this state, the circuit was energized. With a load F of 500 g kept applied to both ends of the core 2 and a voltage of 500V kept applied between the core 2 and the aluminum drum 3, the aluminum drum 3 was rotated to indirectly rotate the conductive foam 1. The electric resistance value was measured 36 times during one rotation. The average value of the 36 electric resistances was computed.

Measurement of Cell Diameter and Number of Cells

The surface of each conductive roller was photographed at a magnification of ×55 by a scan-type electronic microscope (SEM) to observe cells present in 1.5 cm square and measure an average value of cell diameters and the number of cells.

Measurement (Observation) of Pollution of Photoreceptor

Each conductive roller was incorporated in a cartridge commercially available and left for five days in environment having a temperature of 50° C. and a humidity of 55% with the conductive roller in contact with a photoreceptor. The portion of the conductive roller in contact with the photoreceptor was observed by a video microscope. A case in which a foreign matter could be observed on the surface of the photoreceptor was judged that the conductive roller polluted (indicated by "×" in table 1) the photoreceptor.

Measurement of Toner-Scraping Performance

Each conductive roller was incorporated in a cartridge commercially available as a cleaning roller. The cartridge was mounted on a printer (commercial name: "HL4040CN" produced by Brother Industries Ltd.) commercially available. The toner used in the measurement was perfectly spherical polymeric toner having 5 to 10 μm in its volume average particle diameter and 0.90 to 0.99 in its spherical degree.

Print was performed at 5% concentration on 150,000 sheets of paper by using the printer. Thereafter the cartridge was taken out of the printer to visually check toner that could not be collected by the conductive roller. A case in which the toner that remained on the surface of the photoreceptor could not be found visually were judged favorable in the toner-scraping performance of conductive rollers. Thus the conductive rollers were marked by ○. A case in which the toner which remained on the surface of the photoreceptor could be found visually were judged unfavorable in the toner-scraping performance of conductive rollers. Thus the conductive rollers were marked by "×".

Comprehensive Evaluation

Based on the test results, conductive rollers which did not pollute the photoreceptor and had a favorable toner-scraping performance were marked by "○" because they were useful as the cleaning roller. Conductive rollers which polluted the photoreceptor and/or had an unfavorable toner-scraping performance were marked by "×" because they pose problems when they are mounted on the image-forming apparatus.

The conductive rollers of the present invention did not pollute the photoreceptor and had a favorable toner-scraping performance.

On the other hand, the conductive roller of the comparison example 1 which contained a small amount of the epichlorohydrin rubber had a high electric resistance value and an inferior toner-scraping performance. The conductive roller of the comparison example 2 which contained a small amount of the EPDM polluted the photoreceptor. The conductive roller of the comparison example 3 which contained a small amount of the NBR had a high hardness and an inferior toner-scraping performance. The conductive roller of the comparison example 4 contained a large amount of the epichlorohydrin rubber and thus a comparatively small amount of the EPDM and the NBR. Therefore the conductive roller of the comparison example 4 polluted the photoreceptor and had a high hardness and an inferior toner-scraping performance. The conductive roller of the comparison example 5 contained a large amount of the EPDM and thus a comparatively small amount of the epichlorohydrin rubber and the NBR. Therefor the conductive roller of the comparison example 5 had a high hardness and an inferior toner-scraping performance. The conductive roller of the comparison example 6 contained a large amount of the NBR and thus a relatively small amount of the EPDM. Therefore the conductive roller of the comparison example 6 polluted the photoreceptor.

What is claimed is:

1. A conductive roller comprising a core and a conductive foam formed on a peripheral surface thereof,
    wherein said conductive foam consists of a three-phase rubber composition containing 35 to 50 parts by mass of epichlorohydrin rubber, 25 to 35 parts by mass of ethylene-propylene-diene copolymer rubber, and 25 to 30 parts by mass of acrylonitrile-butadiene rubber as a rubber component thereof; and said conductive foam does not have a coating layer formed on a surface thereof; and
    said conductive roller has an Asker C hardness, an electric resistance value, an average surface-cell diameter, and a number of surface cells set to 30 to 36°, $10^6$ to $10^7 \Omega$, 100 to 200 μm, and 50 to 120/1.5 mm square respectively.

2. The conductive roller, according to claim 1, which is used for an image-forming apparatus.

3. The conductive roller, according to claim 2, which is used as a toner-scraping cleaning roller.

4. The conductive roller, according to claim 1, which is used as a toner-scraping cleaning roller.

5. A method of producing a conductive roller comprising the steps of:
adding a foaming agent and a vulcanizing agent to a rubber component consisting of epichlorohydrin rubber, ethylene-propylene-diene copolymer rubber, and acrylonitrile-butadiene rubber components and kneading said components;
extruding said kneaded components in a shape of a roller by an extrusion molder; and vulcanizing and foaming an obtained roller-shaped preform at not less than 160° C. nor more than 170° C. or vulcanizing and foaming said obtained roller-shaped preform after initially setting a temperature to not less than 140° C. and less than 160° C., raising said temperature to not less than 160° C. nor more than 170° C.; and
inserting a core into a hollow portion of said obtained conductive foam and fixing said core thereto,
so as to form a conductive roller comprising a core and a conductive foam formed on a peripheral surface thereof,
wherein said conductive foam consists of a three-phase rubber composition containing 35 to 50 parts by mass of epichlorohydrin rubber, 25 to 35 parts by mass of ethylene-propylene-diene copolymer rubber, and 25 to 30 parts by mass of acrylonitrile-butadiene rubber as a rubber component thereof; and said conductive foam does not have a coating layer formed on a surface thereof; and
said conductive roller has an Asker C hardness, an electric resistance value, an average surface-cell diameter, and a number of surface cells set to 30 to 36°, $10^6$ to $10^7 \Omega$, 100 to 200 μm, and 50 to 120/1.5 mm square respectively.

6. A method of producing a conductive roller comprising the steps of:
adding a foaming agent and a vulcanizing agent to a rubber component consisting of epichlorohydrin rubber, ethylene-propylene-diene copolymer rubber, and acrylonitrile-butadiene rubber components and kneading said components;
extruding said kneaded components in a shape of a roller by an extrusion molder; and vulcanizing and foaming an obtained roller-shaped preform at not less than 160° C. nor more than 170° C. or vulcanizing and foaming said obtained roller-shaped preform after initially setting a temperature to not less than 140° C. and less than 160° C., raising said temperature to not less than 160° C. nor more than 170° C.; and
inserting a core into a hollow portion of said obtained conductive foam and fixing said core thereto,
so as to form an image-forming apparatus conductive roller comprising a core and a conductive foam formed on a peripheral surface thereof,
wherein said conductive foam consists of a three-phase rubber composition containing 35 to 50 parts by mass of epichlorohydrin rubber, 25 to 35 parts by mass of ethylene-propylene-diene copolymer rubber, and 25 to 30 parts by mass of acrylonitrile-butadiene rubber as a rubber component thereof; and said conductive foam does not have a coating layer formed on a surface thereof; and
said conductive roller has an Asker C hardness, an electric resistance value, an average surface-cell diameter, and a number of surface cells set to 30 to 36°, $10^6$ to $10^7 \Omega$, 100 to 200 μm, and 50 to 120/1.5 mm square respectively.

7. A method of producing a conductive roller comprising the steps of:
adding a foaming agent and a vulcanizing agent to a rubber component consisting of epichlorohydrin rubber, ethylene-propylene-diene copolymer rubber, and acrylonitrile-butadiene rubber components and kneading said components;
extruding said kneaded components in a shape of a roller by an extrusion molder; and vulcanizing and foaming an obtained roller-shaped preform at not less than 160° C. nor more than 170° C. or vulcanizing and foaming said obtained roller-shaped preform after initially setting a temperature to not less than 140° C. and less than 160° C., raising said temperature to not less than 160° C. nor more than 170° C.; and
inserting a core into a hollow portion of said obtained conductive foam and fixing said core thereto,
so as to form a toner-scraping cleaning conductive roller comprising a core and a conductive foam formed on a peripheral surface thereof,
wherein said conductive foam consists of a three-phase rubber composition containing 35 to 50 parts by mass of epichlorohydrin rubber, 25 to 35 parts by mass of ethylene-propylene-diene copolymer rubber, and 25 to 30 parts by mass of acrylonitrile-butadiene rubber as a rubber component thereof; and said conductive foam does not have a coating layer formed on a surface thereof; and
said conductive roller has an Asker C hardness, an electric resistance value, an average surface-cell diameter, and a number of surface cells set to 30 to 36°, $10^6$ to $10^7 \Omega$, 100 to 200 μm, and 50 to 120/1.5 mm square respectively.

8. A method of producing a conductive roller comprising the steps of:
adding a foaming agent and a vulcanizing agent to a rubber component consisting of epichlorohydrin rubber, ethylene-propylene-diene copolymer rubber, and acrylonitrile-butadiene rubber components and kneading said components;
extruding said kneaded components in a shape of a roller by an extrusion molder; and vulcanizing and foaming an obtained roller-shaped preform at not less than 160° C. nor more than 170° C. or vulcanizing and foaming said obtained roller-shaped preform after initially setting a temperature to not less than 140° C. and less than 160° C., raising said temperature to not less than 160° C. nor more than 170° C.; and
inserting a core into a hollow portion of said obtained conductive foam and fixing said core thereto,
so as to form a toner-scraping cleaning conductive roller for an image-forming apparatus comprising a core and a conductive foam formed on a peripheral surface thereof,
wherein said conductive foam consists of a three-phase rubber composition containing 35 to 50 parts by mass of epichlorohydrin rubber, 25 to 35 parts by mass of ethylene-propylene-diene copolymer rubber, and 25 to 30 parts by mass of acrylonitrile-butadiene rubber as a rubber component thereof; and said conductive foam does not have a coating layer formed on a surface thereof; and
said conductive roller has an Asker C hardness, an electric resistance value, an average surface-cell diameter, and a number of surface cells set to 30 to 36°, $10^6$ to $10^7 \Omega$, 100 to 200 μm, and 50 to 120/1.5 mm square respectively.

* * * * *